United States Patent [19]

Nakamura et al.

[11] Patent Number: 4,917,595
[45] Date of Patent: Apr. 17, 1990

[54] NOZZLE TOUCH SPRUE BUSHING DEVICE

[75] Inventors: Susumu Nakamura; Koichi Yokoi; Hajime Nakamura, all of Yamanashi, Japan

[73] Assignee: Sankyo Engineering Co., Ltd., Yamanashi, Japan

[21] Appl. No.: 278,845

[22] Filed: Dec. 2, 1988

[30] Foreign Application Priority Data

Jun. 1, 1988 [JP] Japan .............................. 63-71682[U]
Jun. 6, 1988 [JP] Japan .............................. 63-74296[U]
Jun. 6, 1988 [JP] Japan .............................. 63-74297[U]

[51] Int. Cl.⁴ ............................................. B29C 45/22
[52] U.S. Cl. .................................... 425/567; 425/568; 425/569
[58] Field of Search ........................ 425/567, 568, 569

[56] References Cited

U.S. PATENT DOCUMENTS 3,934,626 1/1976 Hall ..................................... 425/567
4,299,791 11/1981 Aoki ..................................... 425/569

Primary Examiner—Jay H. Woo
Assistant Examiner—Timothy W. Heitbrink
Attorney, Agent, or Firm—Colucci & Umans

[57] ABSTRACT

A nozzle touch sprue bushing device for a unit-type injection metal mold which includes a molding body such as a metal mold including an inner mold element which is removably mounted on an outer frame mounted on an injecting molding machine, wherein a sprue bush has a nozzle touch provided at a rear end thereof for fitting with an end of a nozzle of an injecting machine, and has a front end formed in such a fitting configuration as to allow fitting engagement thereof with a material admitting portion of a metal mold.

14 Claims, 3 Drawing Sheets

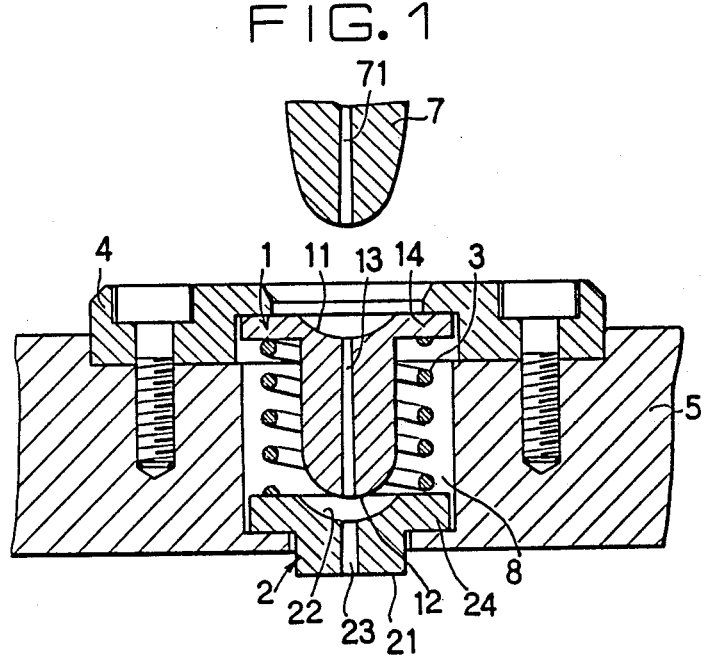
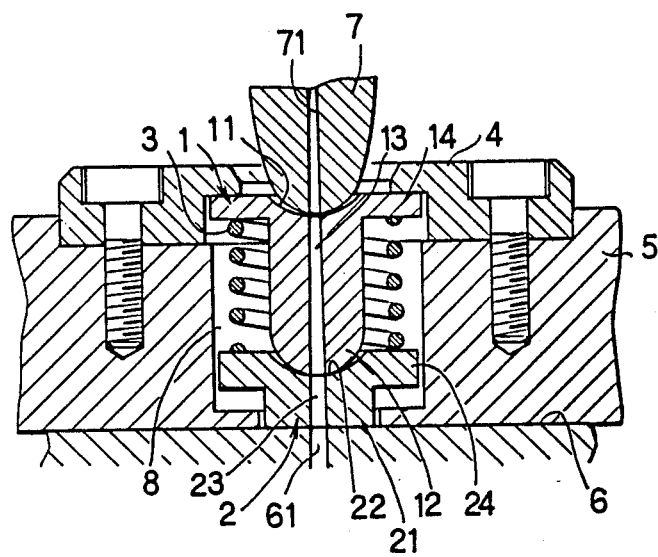

NOZZLE TOUCH SPRUE BUSHING DEVICE

BACKGROUND OF THE INVENTION

1. Field of the Invention

This invention relates to a nozzle touch sprue bushing device to be provided at an introducing and connecting portion for a plastic material such as a synthetic resin provided on an outer frame in a unit-type injection metal mold or the like wherein a molding element body such as the metal mold or the like includes an inner mold element which is removably mounted on the outer frame mounted on an injection molding machine.

2. Description of the Prior Art

In an injection molding machine which injects a molten plastic material at a high temperature and at a high pressure to mold at one stroke, if connection of a material introducing path is incomplete even a little, leakage of resin will take place so that not only articles may fail but also there is the possibility that a danger may be caused in operation. Thus, conventionally the introducing paths of an injecting machine and a molding element are formed as an integral single material introducing path except at a nozzle touch between the injecting machine and the molding element, and contacting connection between the introducing paths cannot be anticipated. However, in order to change the type of articles to be molded, the entire metal mold must be exchanged, which is very uneconomical. Thus, in order to cope with this problem, an improvement has been proposed wherein a metal mold is divided into an inner mold element and an outer frame so that the type of articles to be molded can be changed more easily. In such an arrangement, interconnection between the introducing paths of the inner mold element and the outer frame relies upon the accuracy of a mirror face working of mutually contacting faces of the inner mold element and the outer frame and also upon a positioning and fixing technique depending upon lapping upon fitting of the inner mold element into the outer frame.

In this instance, the steps at which a highest skill is required for contacting connection of the introducing paths are to finish contacting faces of both elements in which the relay introducing paths are provided so that they may have surfaces of a very high accuracy and to position the contacting faces in parallel to each other and contact them closely to each other. If the accuracy in such surface finish is low, this will cause a problem that leakage of a resin material may take place so that unacceptable molded articles may be produced. Incidentally, in molding of a plastic material, molten plastic material is injected at a high pressure of 2,000 kg/cm$^2$ to 1,500 kg/cm$^2$ in the case of engineering plastics and of at least 300 kg/cm$^2$ in the case of plastics for toys and so on which require a very high accuracy.

Further, connection between an introducing path and an injecting path requires much labor and a high technique to make an adjustment at several times by lapping depending upon temporary fastening as positioning when an inner mold element is fitted into an outer frame.

SUMMARY OF THE INVENTION

It is an object of the present invention to provide a nozzle touch sprue bushing device wherein an end of a sprue bush having a nozzle touch formed thereon for fitting with an end of a nozzle of an injecting machine and a material admitting portion of a metal mold can be automatically fitted with each other so that resin injecting and introducing paths of an inner mold element and an outer frame of the metal mold and the injecting machine may be automatically interconnected without requiring a high skill.

In order to attain the object, according to one aspect of the present invention, a sprue bush and a plate bush which have introducing paths formed therein which are interconnected by means of a universal joint mechanism depending upon spherical face contact or tapered face contact including mutually fitting configurations formed on the sprue bush and the plate bush are mounted for movement and normally urged in directions opposite to the respective pressure receiving directions thereof so that adjustment of the mutually contacting faces of the sprue bush and the plate bush may be made automatically.

According to another aspect of the present invention, conventional contacting face connection which has relied only upon close contact depending upon surface finish of a high accuracy is replaced by fitting connection of a sprue bush and a material admitting portion of a metal mold in which mutually contacting portions are formed in mutually fitting or complementary configurations, and the sprue bush is normally acted upon by a spring so that, when an inner mold element of the metal mold is mounted on an outer frame, the fitting portion of the sprue bush is accommodated in a housing by the urging force of the spring and does not project to the fitting face of the material admitting portion of the metal mold while the injecting pressure is utilized as a material leakage preventing force.

According to a further aspect of the present invention, conventional contacting face connection which has relied only upon close contact depending upon surface finish of a high accuracy is replaced by fitting connection of a sprue bush and a material admitting portion of a metal mold in which mutually contacting portions are formed in mutually fitting or complementary configurations so that interconnection between an injecting path and an introducing path which has been conventionally conducted in a groping condition may be attained assuredly only by inserting and fitting a convex fitting portion at an end of the sprue bush into a recess of the material admitting portion of the metal mold while clearance adjustment is made by a backing plate which is mounted for movement and normally acted upon by an urging force of a spring.

The above and other objects, features and advantages of the present invention will become apparent from the following description and the appended claims, taken in conjunction with the accompanying drawings.

BRIEF DESCRIPTION OF THE DRAWINGS

FIG. 1 is a vertical sectional side elevational view of a nozzle touch sprue bushing device according to a first embodiment of the present invention before an introducing path for a resin material or the like is connected thereto;

FIG. 2 is a similar vertical sectional side elevational view of the nozzle touch sprue bushing device of FIG. 1 after the introducing path for a resin material or the like is connected thereto;

DETAILED DESCRIPTION OF THE PREFERRED EMBODIMENTS

Figure 3:
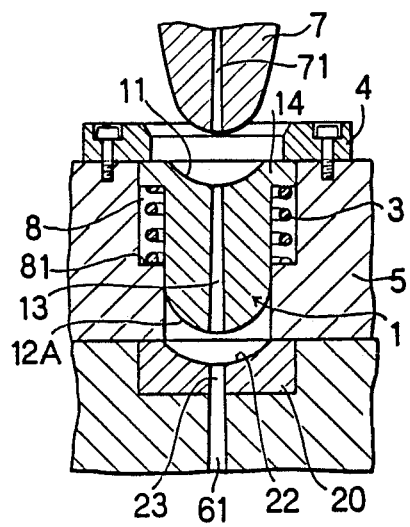
FIG. 3 is a vertical sectional side elevational view of a nozzle touch sprue bushing device according to a second embodiment of the present invention before an introducing path for a resin material or the like is connected thereto.

Referring first to FIGS. 1 and 2, there is shown a nozzle touch sprue bushing device according to a first preferred embodiment of the present invention. The nozzle touch sprue bushing device shown includes a sprue bush 1 having a nozzle touch 11 formed at a rear end thereof and having a spherical face or shaped fitting portion 12 at a front end thereof. An injection route 13 is formed at and extends through the center of the sprue bush 1. The nozzle touch sprue bushing device further includes a plate bush 2 having a spherical face contacting recess or shaped engagement portion 22 formed at a rear end thereof corresponding to the spherical face 12 of the sprue bush 1 and having a contacting face 21 formed at a front end thereof for contacting with a contacting face 6 of a material admitting portion of an inner mold element of a metal mold. An injection route 23 is formed at and extends through the center of the plate bush 2. A housing 8 is provided in an interposed portion 5 of an outer frame or the like which is interposed between an injecting nozzle 7 of an injecting machine and the contacting face 6 of the inner mold element of the metal mold, and a compression coil spring 3 is received in the housing 8 and extends between a flange 14 of the sprue bush 1 and another flange 24 of the plate bush 2. Consequently, the sprue bush 1 and the plate bush 2 are urged to move away from each other by the spring 3, and the sprue bush 1 is packed by a locating ring 4 so that an upper face of the flange 14 of the sprue bush 1 is resiliently pressed against a bottom face of the locating ring 4 while a bottom face of the flange 24 of the plate bush 2 is resiliently pressed against an upper face of a bottom plate of the housing 8.

As the contacting face 6 around an introducing path 61 is contacted with the contacting face 21 of the plate bush 2 as a result of fitting of a molding element such as the inner mold element of the metal mold in position, the spring 3 is compressed as seen in FIG. 2 until the spherical face 12 of the sprue bush 1 and the spherical face contacting recess 22 of the plate bush 2 are contacted with each other, which constitute a universal coupling structure described hereinabove. Further, as the injection nozzle 7 is fitted with the nozzle touch 11 of the sprue bush 1, the injecting path 71, injection routes 13 and 23 and introducing path 61 are opened.

Subsequently, operation of the nozzle touch sprue bushing device will be described.

If the contacting face 6 of the inner mold element having the introducing path 61 therein is contacted obliquely with the contacting face 21 of the plate bush 2, the plate bush 2 is moved so that the spherical face contacting recess 22 thereof is brought into contact with and then slidably moved on the spherical face 12 of the sprue bush 1 until the contacting face 21 of the plate bush 2 is brought into a parallel position to the contacting face 6 of the inner mold element by the pressure thereupon from the contacting face 6 and compression of the spring 3 is averaged. The corresponding position of the plate bush 2 is corrected in this manner.

When a material is to be injected, the injection nozzle 7 is advanced so that it is fitted with the nozzle touch 11 of the sprue bush 1 as seen in FIG. 2 and moves the sprue bush 1 while compressing the spring 3. In this instance, since the compression of the spring 3 has been already averaged by the pressure from the contacting face 6 of the inner mold element, the pressing force of the injection nozzle 7 is transmitted to the sprue bush 1 without causing any displacement of the sprue bush 1.

Since the nozzle touch sprue bushing device of the first embodiment of the present invention has such a construction as described above, each of the communicating portions for the resin injecting introducing path can be automatically made into a hard metal touch without requiring a high skill, which will contribute to reduction in cost of the metal mold and enable coping with molding at a high injecting pressure.

Figure 4:
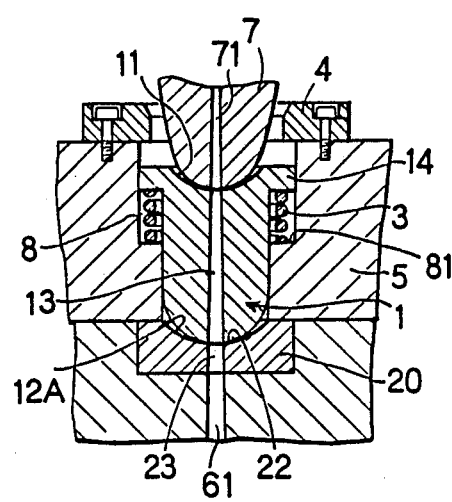
FIG. 4 is a similar vertical sectional side elevational view of the nozzle touch sprue bushing device of FIG. 3 after the introducing path for a resin material or the like is connected thereto.

Referring now to FIGS. 3 to 6, there is shown a nozzle touch sprue bushing device according to a second preferred embodiment of the present invention. The nozzle touch sprue bushing device shown in FIGS. 3 and 4, includes a sprue bush 1 having a nozzle touch 11 formed at a rear end thereof and having an end fitting portion 12A formed in a spherical shape at a front end thereof. An injection route 13 is formed at and extends through the center of the sprue bush 1. A spherical face contacting recess 22 corresponding to the spherical end fitting portion 12A at the front end of the sprue bush 1 is formed at a portion of a material admitting portion 20 of an inner mold element of a metal mold adjacent an introducing path 61 formed in the metal mold, and an injection route 23 is formed at the center of the material admitting portion 20 of the inner mold element. A housing 8 is provided in an interposed portion 5 of an outer frame or the like which is interposed between an injection nozzle 7 of an injecting machine and the material admitting portion 20 of the inner mold element, and a compression coil spring 3 is received in the housing 8 and extends between a flange 14 of the sprue bush 1 and a stepped portion 81 provided in the housing 8. Consequently, the sprue bush 1 is urged in the upward direction in FIGS. 3 and 4 and is packed by a locating ring 4 so that an upper face of the flange 14 of the sprue bush 1 is resiliently pressed against a bottom face of the locating ring 4. Accordingly, except when the sprue bush 1 is pressed down by the injection nozzle 7, the sprue bush 1 is accommodated in the housing 8 and will not interfere with the inner mold element or the like of the metal mold upon fitting of the metal mold. If the injection nozzle 7 of the injecting machine is advanced and fitted with the nozzle touch 11 of the sprue bush 1 as seen in FIG. 4, then the sprue bush 1 is moved down while compressing the spring 3 until the spherical end fitting portion 12A of the sprue bush 1 is fitted with the spherical face contacting recess 22 of the material admitting portion 20, thereby establishing an introducing route for a material to be injected.

Figure 5:
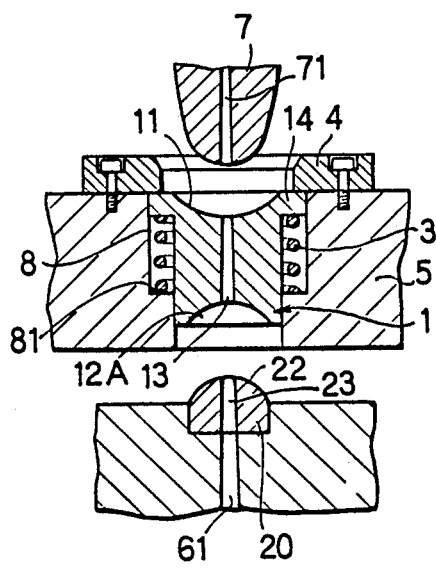
FIG. 5 is a view similar to FIG. 3 but showing a modified nozzle touch sprue bushing device wherein a spherical recess is formed at an end of a bush thereof.
Figure 6:
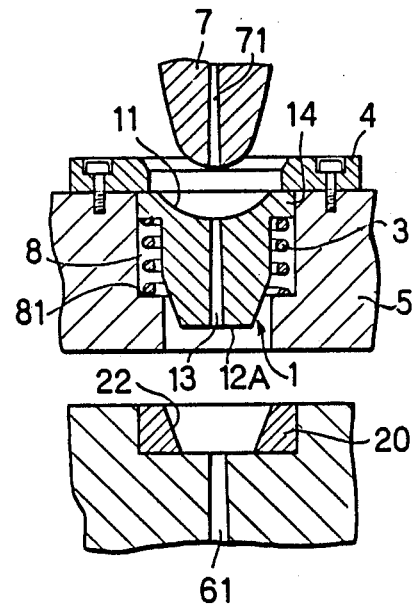
FIG. 6 is a similar view but showing another modified nozzle touch sprue bushing device wherein a truncated conical face is formed at an end of a bush thereof.

FIG. 5 illustrates a modification to the nozzle touch sprue bushing device shown in FIGS. 3 and 4. In the modification shown in FIG. 5, a sprue bush 1 has a spherical face 12A formed at a front end thereof while a material admitting portion 20 has a spherical contacting face 22 formed at an end thereof for face-to-face contacting with the spherical face 12A of the sprue bush 1. Meanwhile, FIG. 6 illustrates another modification to the nozzle touch sprue bushing device shown in FIGS. 3 and 4. In the modification shown in FIG. 6, a sprue bush 1 has a conical face 12A formed at a front end thereof while a material admitting portion 20 has a conical recess or hole 22 formed therein for face-to-face contacting with the conical face 12A of the sprue bush 1.

Subsequently, operation of the nozzle touch sprue bushing device shown in FIGS. 3 and 4 will be described.

If the injection nozzle 7 of the injecting machine is advanced so that it is fitted with the nozzle touch 11 provided at the rear end of the sprue bush 1, it moves the sprue bush 1 forwardly while compressing the spring 3 which is provided for urging the sprue bush 1 toward the injecting machine side to resiliently press and hold the sprue bush 1 against and on a rear face of the locating ring 4. Thereupon, the fitting portion 12A at the front end of the sprue bush 1 is projected downwardly until it is fitted with the spherical contacting recess 22 of the material admitting portion 20 of the metal mold, thereby interconnecting the injection path 71 of the injection nozzle 7, the injection route 13 of the sprue bush 13 and the injection route 23 of the material admitting portion 20.

Since the nozzle touch sprue bushing device of the second embodiment of the present invention has such a construction as described above, while the sprue bush and the material admitting portion of the metal mold are contacted with each other not depending upon flat face contact which will readily cause leakage of a material but depending upon different specific contact which will little cause leakage of a material, the fitting portion of the sprue bush is accommodated into the housing when the metal mold is mounted, and when the injection nozzle is advanced to push the nozzle touch of the sprue bush, the fitting portion of the sprue bush is fitted with the fitting portion of the metal mold. Such coupling is strengthened by the injecting pressure. Accordingly, the nozzle touch sprue bushing devices can cope with molding at a high injecting pressure.

Figure 7:
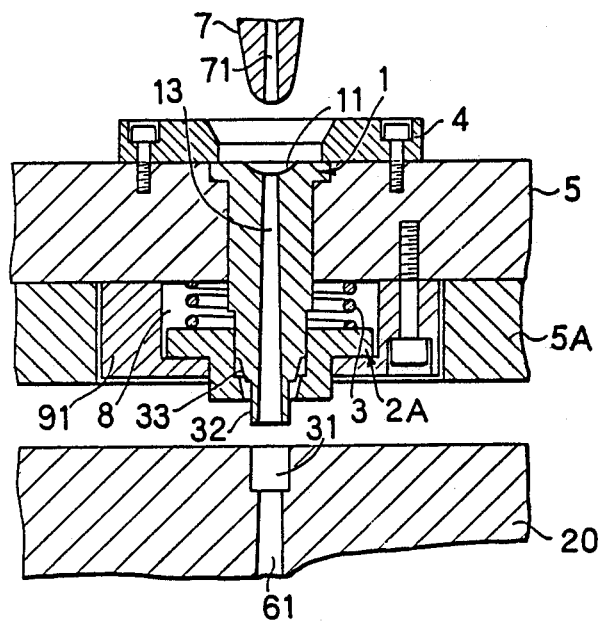
FIG. 7 is a vertical sectional side elevational view of a nozzle touch sprue bushing device according to a third embodiment of the present invention before an inner mold element is mounted.
Figure 8:
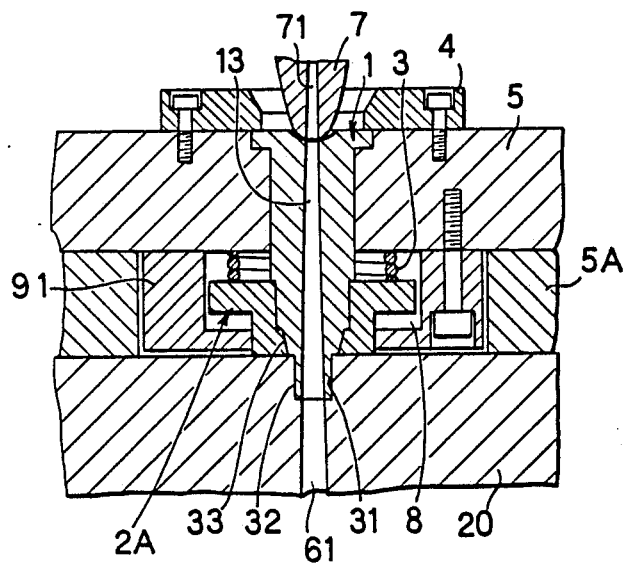
FIG. 8 is a similar vertical sectional side elevational view of the nozzle touch sprue bushing device of FIG. 7 after an inner mold element is mounted.

Referring now to FIGS. 7 and 8, there is shown a nozzle touch sprue bushing device according to a third embodiment of the present invention. The nozzle touch sprue bushing device shown includes a sprue bush 1 having a nozzle touch 11 formed at a rear end thereof and having a convex fitting portion 32 formed at a front end thereof. The convex fitting portion 32 of the sprue bush 1 has such a shape as to allow the same to fit with a recess 31 formed in a material admitting portion 20 of an inner mold element of a metal mold, and injection route 13 penetrates the sprue bush 1 at the central portion thereof. While, the fitting shape of the convex projection or fitting portion 32 and the recess 31 is not limited cylindrical shape but also rectangular one. An introducing path 61 is formed in a continuous relationship to the recess 31 at the center of the material admitting portion 20 of the inner mold element. The sprue bush 1 is fitted in an interposed portion 5 of an outer frame or the like which is interposed between an injection nozzle 7 of an injecting machine and the material admitting portion 20 of the inner mold element of the metal mold, and the sprue bush 1 is fixed to the interposed portion 5 by means of a locating ring 4. A packing plate 2A similar to the plate bush 2 of the nozzle touch sprue bushing device of the first embodiment shown in FIGS. 1 and 2 is fitted on the sprue bush 1 and normally urged toward the material admitting portion 20 of the inner mold element by a compression coil spring 3 received in a housing 8 provided in a casing 91. The packing plate 2A has such an inner peripheral face of a suitable configuration such as a tapered face that it may closely contact with an outer peripheral fitting portion 33 of the sprue bush 1.

Subsequently, operation of the nozzle touch sprue bushing device of FIGS. 7 and 8 will be described.

If the convex fitting portion 32 at the front end of the sprue bush 1 is fitted into the countersunk recess 31 provided in the material admitting portion 20 of the inner mold element of the metal mold, the basic fitting position of the inner mold element with respect to the outer frame 5 is automatically determined, and when the inner mold element is fixed to a fixed side plate 5A of the outer frame 5, the packing plate 2A which is mounted for movement and urged toward the inner mold element by the spring 3 is pushed by the inner mold element being fitted so that it is ring-fitted with the sprue bush 1 under the guidance of the outer peripheral fitting portion 33 of the sprue bush 1 while it seals the circumference of the recess 31 of the material admitting portion 20 of the inner mold element by the pressure thereupon caused by a reactive force of the spring 3.

Since the nozzle touch sprue bushing device of the third embodiment of the present invention has such a construction as described above, the sprue bush and the material admitting portion of the metal mold are contacted with each other not depending upon flat face contact which will readily cause leakage of a material but depending upon different specific contact which will little cause leakage of a material and will assure interconnection of injection routes. Further, when the inner mold element or the like is to be mounted, fitting of the fitting portions of the sprue bush and the material admitting portion of the inner mold element with each other automatically determines the basic mounting position of the inner mold element in the outer frame, which facilitates a mounting operation of the inner mold element or the like.

Also, there are effects that leakage of a resin material can be prevented completely without the necessity of improving the accuracy in face machining very much, and so on.

What is claimed is:

1. A nozzle touch sprue bushing device, comprising:
an outer frame having an interposed portion;
an inner mold element having a material admitting portion;
a sprue bush located in said interposed portion, said sprue bush having a rear end with a nozzle touch portion for engagement by an injection nozzle of an injection machine for receiving material injected by the injection machine, said sprue bush having a front end with a shaped fitting portion for engagement with said material admitting portion, said material admitting portion having a shaped engagement portion, one of said shaped fitting and engagement portions being concave and the other of said shaped fitting and engagement portions being convex, said shaped fitting and engagement portions being complimentary in shape for close engagement therebetween for establishing a leak resistant path between said sprue bush and said inner mold element; and biasing means operatively engaged between said sprue bush and said material admitting portion for biasing said shaped fitting and engagement portions apart from each other, said biasing means being counteracted by engagement of an injection nozzle against said sprue bush and engagement of said interposed portion against said inner mold element for engaging said shaped fitting and engagement portions against each other.

2. A device according to claim 1 wherein said material admitting portion comprises a plate bush having a rear end carrying said shaped engagement portion and a front end having a contact face for close contact against said inner mold element.

3. A device according to claim 2 wherein said interposed portion includes a hollow housing, said sprue bush and said plate bush being mounted in said housing, said biasing means being engaged between said sprue bush and said plate bush for urging said sprue and plate bushes apart.

4. A device according to claim 3 wherein said biasing means comprises a spring engaged between said sprue and plate bushes, in said housing.

5. A device according to claim 4 wherein said shaped fitting portion is convex and said shaped engagement portion is concave.

6. A device according to claim 5 wherein said shaped fitting and engagement portions are spherical.

7. A device according to claim 5 wherein said shaped fitting and engagement portions are conical.

8. A device according to claim 1 wherein said shaped fitting portion is spherical and convex, said shaped engagement portion being spherical and concave.

9. A device according to claim 1 wherein said shaped fitting portion is spherical and concave, said shaped engagement portion being spherical and convex.

10. A device according to claim 1 wherein said shaped fitting portion has a truncated convex conical shape and said shape engagement portion has a truncated concave conical shape.

11. A device according to claim 1 wherein said material admitting portion comprises a packing plate mounted to said interposed portion, said packing plate having a front end carrying said shaped engagement portion and a rear end carrying a contact face for contacting said inner mold element.

12. A device according to claim 11 wherein said interposed portion includes a housing for receiving said sprue bush and said packing plate, said biasing means biasing said packing plate with said shaped engagement portion in a direction away from said shaped fitting portion of said sprue bush.

13. A device according to claim 12 wherein said biasing means comprises a spring in said housing engaged between said interposed portion and said packing plate for urging said packing plate away from said shaped fitting portion of said sprue bush.

14. A device according to claim 12 wherein said sprue bush includes a projecting portion extending from the front end of said sprue bush and outwardly of said shaped fitting portion, said inner mold element including a recess for receiving said projecting portion, said projecting portion extending through said packing plate.

* * * * *